| (12) | United States Patent | (10) Patent No.: | US 7,715,654 B2 |
| Chefd'hotel et al. | | (45) Date of Patent: | May 11, 2010 |

(54) SYSTEM AND METHOD FOR FAST MULTIMODAL REGISTRATION BY LEAST SQUARES

(75) Inventors: Christophe Chefd'hotel, Princeton, NJ (US); Wanmei Ou, Cambridge, MA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 880 days.

(21) Appl. No.: 11/580,670

(22) Filed: Oct. 13, 2006

(65) Prior Publication Data

US 2007/0086678 A1   Apr. 19, 2007

Related U.S. Application Data

(60) Provisional application No. 60/727,674, filed on Oct. 18, 2005.

(51) Int. Cl.
*G06K 9/32* (2006.01)
*G06K 9/00* (2006.01)
*G09G 5/00* (2006.01)

(52) U.S. Cl. .................. 382/294; 382/128; 382/295; 345/648

(58) Field of Classification Search .................. 382/128, 382/294
See application file for complete search history.

(56) References Cited

U.S. PATENT DOCUMENTS 6,266,453 B1 * 7/2001 Hibbard et al. ............. 382/294

6,611,615 B1 * 8/2003 Christensen ................ 382/130
7,397,934 B2 * 7/2008 Bloch et al. ................ 382/128

OTHER PUBLICATIONS

Simon Baker, et al., :Lucas-Kanade 20 Years on: A Unifying Framework International Journal Of Computer Vision 56(3), 221-255, 2004.

Alexis Roche, et al., "Unifying Maximum Likelihood Approaches in Medical Image Registration" Inria, Epidaure Project, 2004, route des Lucioles, PB 93, 06902 Sophia Antipolis Cedex, France.

* cited by examiner

*Primary Examiner*—Anand Bhatnagar
*Assistant Examiner*—Jose M Torres
(74) *Attorney, Agent, or Firm*—Donald B. Paschburg; F. Chau & Associates, LLC

(57) ABSTRACT

A method for multimodal image registration includes providing a pair of images acquired from differing imaging modalities, defining an intensity correction function that corrects the intensities of a first image in terms of the intensities of the second image, defining a registration transformation function that registers the second image with the first image, wherein said intensity correction function and transformation function are functions of a plurality of parameters, obtaining corrections to the plurality of parameters by minimizing an energy functional of a square difference of the intensity corrected first image and the registration transformed second image, and updating the intensity correction function and the registration transformation function based on the corrected plurality of parameters.

28 Claims, 7 Drawing Sheets

(a) Before registration  (b) After registration

SYSTEM AND METHOD FOR FAST MULTIMODAL REGISTRATION BY LEAST SQUARES

CROSS REFERENCE TO RELATED UNITED STATES APPLICATIONS

This application claims priority from: "Least Squares Methods for Fast Multimodal Registration", U.S. Provisional Application No. 60/727,674 of Chefd'hotel, et al., filed Oct. 18, 2005, the contents of which are incorporated herein by reference.

TECHNICAL FIELD

This invention is directed to registration of multi-modal medical images.

DISCUSSION OF THE RELATED ART

Fusion of complementary information acquired from multimodal imaging techniques relies on accurate image registration. As joint multimodal image analysis plays an increasingly important role in clinical practice and scientific research, a fast and robust multimodal image registration algorithm is desired. Algorithms proposed for multimodal image registration can be coarsely labeled into two categories: anatomical feature based and intensity based algorithms. The former algorithms focus on extracting and matching corresponding anatomical structures, referred to as landmarks, in the registration process; the latter algorithms take into account intensity variations of the corresponding anatomical structures caused by the differing imaging modalities.

Similar to feature based registration algorithms, intensity based algorithms are usually formulated as an optimization problem. Hence, there are two aspects in a registration algorithm: (1) an accurate similarity measure of an image pair, which is commonly referred to as the energy function; (2) a fast and robust optimization method. Some popular similarity measures for multimodal registration include mutual information (MI), correlation coefficient, and correlation ratio. All of these measure the statistical dependence between intensity values of an image pair with different assumptions on the data. Among these, MI has the most general constraints, while correlation ratio is robust to sparse data. One recent technique incorporated a functional intensity transformation between an image pair in the registration process, and alternately estimates the intensity transformation and minimizes the energy function with respect to the transformation parameters.

In general, the nature of a similarity measure restricts methods for optimization. For example, because it is difficult to obtain the second order derivative of MI, MI is usually optimized using gradient descent method or its variational versions. On the other hand, if the energy function can be written in a sum of squares format, a Gauss-Newton method can be used. The Gauss-Newton method is specific for non-linear least squares problems, and it is in general much faster and fewer parameters as compared to gradient descent based methods.

SUMMARY OF THE INVENTION

Exemplary embodiments of the invention as described herein generally include methods and systems for incorporating an intensity correction into the sum of squared differences registration algorithm for multimodal registration, and optimizing the resulting energy function using Gauss-Newton method. An explicit functional relationship is assumed between the intensity of an image pair. Algorithms according to an embodiment of the invention have been tested on MR-T1-MR-T2 registration and MR-PET registration, and accurate registration has been achieved.

According to an aspect of the invention, there is provided a method for multimodal image registration including providing a pair of images, each image of said pair acquired from a different imaging modality, each said image comprising a plurality of intensities corresponding to a domain of points on an N-dimensional grid, defining an intensity correction function that corrects the intensities of a first of said pair of images in terms of the intensities of the second of said pair of images, defining a registration transformation function that registers said second image with said first image, wherein said intensity correction function and transformation function are functions of a plurality of parameters, obtaining corrections to said plurality of parameters by minimizing an energy functional of a square difference of said intensity corrected first image and said registration transformed second image, and updating said intensity correction function and said registration transformation function based on said corrected plurality of parameters.

According to a further aspect of the invention, the registration transformation function is either an affine transformation or a rigid transformation.

According to a further aspect of the invention, the intensity correction function is an $m^{th}$-order polynomial function According to a further aspect of the invention, the intensity correction function is a piecewise linear function of said parameters.

According to a further aspect of the invention, the steps of updating said intensity correction function and said registration transformation function and obtaining corrections to said plurality of parameters are repeated until said energy functional stops decreasing as a result of said corrections or differences in said energy functional become less than a predetermined constant.

According to a further aspect of the invention, the parameters are updated according to $q_{i+1} \leftarrow q_i + \delta q$, wherein $q_i$ are the uncorrected parameters, $q_{i+1}$ are the corrected parameters, and $\delta q$ are the parameter corrections.

According to a further aspect of the invention, the parameter corrections $\delta q$ take a form equivalent to $$-\hat{H}^{-1}\sum_{i=1}^{N}\left[\frac{\partial \Phi(f(x_i), q)}{\partial q} - \nabla g \frac{\partial \tilde{T}(x_i, q)}{\partial q}\right]^T (\Phi(f(x_i), q) - g(\tilde{T}(x_i, q)))$$

wherein $$\hat{H} = \sum_{j=1}^{N}\left[\frac{\partial \Phi(f(x_j), q)}{\partial q} - \nabla g \frac{\partial \tilde{T}(x_j, q)}{\partial q}\right]^T \left[\frac{\partial \Phi(f(x_j), q)}{\partial q} - \nabla g \frac{\partial \tilde{T}(x_j, q)}{\partial q}\right],$$

and wherein q represents the plurality of parameters, $\tilde{\Phi}$ represents the intensity correction function, $f(x_i)$ represents said first image as a function on domain points $x_i$, N is the number of image domain points, $\tilde{T}$ represents the registration transformation function, g represents said second image, wherein the gradient of g is evaluated at $T(x_i, q_0)$ wherein $q_0$ are the uncorrected parameters, and $\partial T/\partial q$ is the Jacobian of the registration transformation evaluated at $(x_i, q_0)$.

According to a further aspect of the invention, the intensity correction function is a function of parameter subset a and said registration transformation function is a function of parameter subset p, and wherein obtaining corrections to said plurality of parameters comprises minimizing said energy functional with respect to intensity correction parameters a holding parameters p fixed to obtain updated intensity correction parameters â, expressing said energy functional in terms of said updated intensity correction parameters, minimizing said energy functional with respect to transformation parameters p to obtain corrected transformation parameters δp.

According to a further aspect of the invention, the registration transformation function is calculated using an image pyramid.

According to a further aspect of the invention, the plurality of parameters are computed using a fraction of points in said images.

According to a further aspect of the invention, the energy functional is minimized with a Gauss-Newton algorithm.

According to a further aspect of the invention, the energy functional is a weighted sum of square differences of said intensity corrected first image and said registration transformed second image.

According to a further aspect of the invention, the intensity correction function is a function of parameter subset a and said registration transformation function is a function of parameter subset p, and wherein said intensity correction function Φ and registration transformation function T can be updated compositionally according to $T(x_i, p) \leftarrow T(T(x_i, \delta p), p_0)$ and $\Phi(f(x_i), a) \leftarrow \Phi(\Phi(f(x_i), \delta a), a_0)$, wherein $f(x_i)$ is the image intensity at image point $x_i$, $p_0$ and $a_0$ are the respective uncorrected intensity correction and transformation parameters, and δp and δa are the respective intensity correction and transformation parameter corrections.

According to another aspect of the invention, there is provided a program storage device readable by a computer, tangibly embodying a program of instructions executable by the computer to perform the method steps for multimodal image registration.

DETAILED DESCRIPTION OF THE PREFERRED EMBODIMENTS

Figure 1:
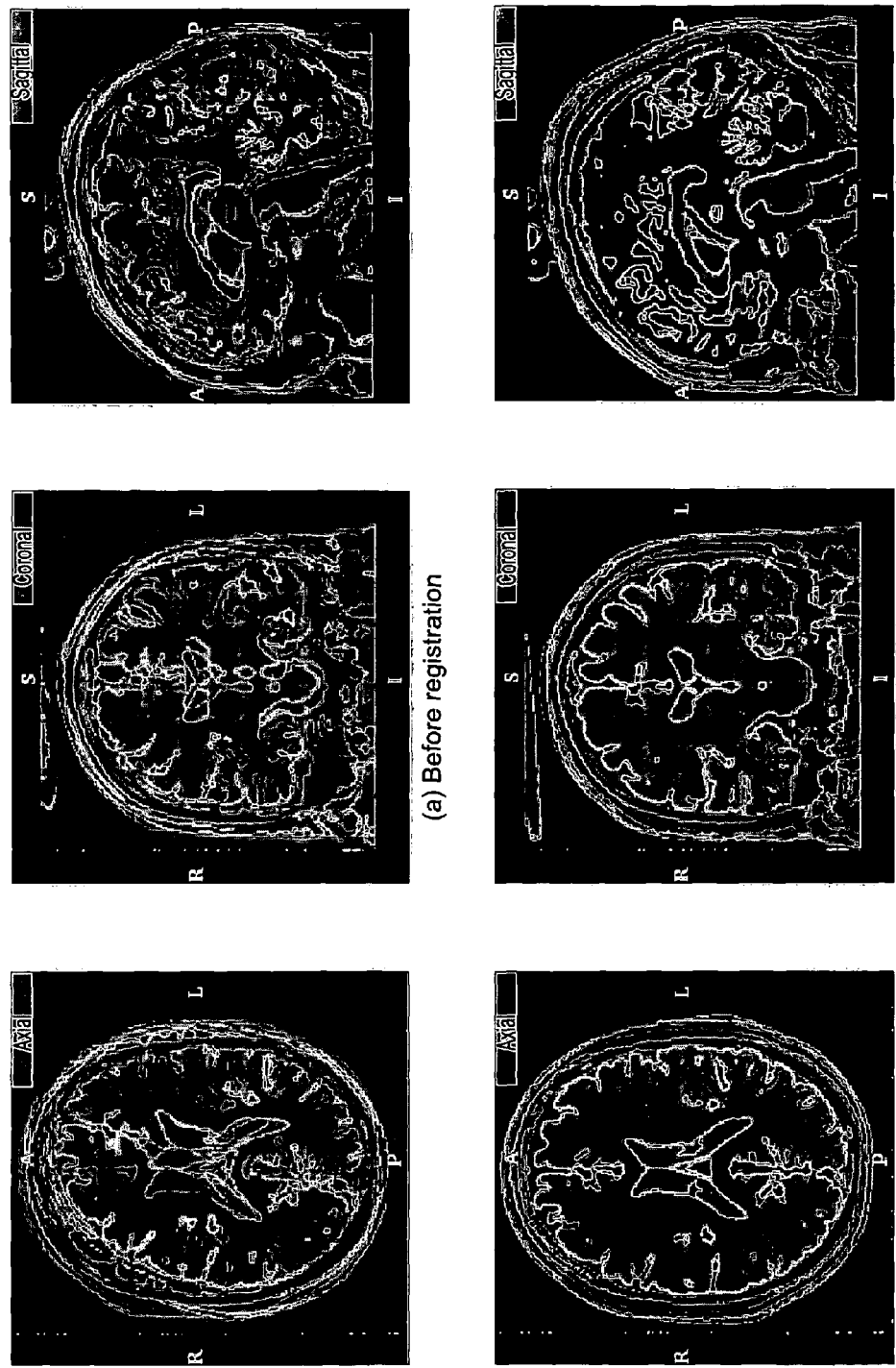
FIGS. 1(a)-(b) depict MR T1 and T2 images before and after registration, according to an embodiment of the invention.

Exemplary embodiments of the invention as described herein generally include systems and methods for intensity-corrected sum-of-squared-differences multimodal registration. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Gauss-Newton Method for Optimization

A Gauss-Newton method is commonly employed to optimize functions which can be written as a sum of squares:

$$E(q) = \frac{1}{2}\sum_{i=1}^{N} e_i^2(q)$$

where, $q=[q_1; q_2; \ldots; q_m]$ are the parameters of function, $e_i$, for $i=1; 2; \ldots; N$, and N is the number of samples used to calculate the energy. If the second order derivative of $e_i$ is not accessible or difficult to obtain but the first order derivative is available, the Gauss-Newton method becomes handy. The Gauss-Newton method is an iterative procedure that approximates the Hessian matrix, the second order derivative, of the function $e_i$ using a Taylor expansion:

$$e_i(q_0 + \delta q) = e_i(q_0) + \frac{de_i}{dq}\delta q + O(e_i) \forall i,$$

where $O(e_i)$ are the higher order terms in the expansion. If the function $e_i(q_0+\delta q)$ is approximated by the first two terms in the expansion, the energy function can be rewritten as:

$$E(q_0 + \delta q) \approx \frac{1}{2}\sum_{i=1}^{N}\left(e_i(q_0) + \frac{de_i}{dq}\delta q\right)^2,$$

where $q_0$ is the current estimate and δq represents update in the parameters to minimize the energy. To obtain δq, the first order derivative of E is set to zero to solve $$\frac{dE}{d\delta q} = \sum_{i=1}^{N}\left[\frac{de_i}{dq}\right]^T\left(e_i(q_0) + \frac{de_i}{dq}\delta q\right) = 0, \quad (1)$$

which yields the following equation for δq:

$$\delta q = -\hat{H}^{-1} \sum_{i=1}^{N} \left[\frac{de_i}{dq}\right]^T e_i(q_0),$$

where $$\hat{H} = \sum_{j=1}^{N} \left[\frac{de_j}{dq}\right]^T \left[\frac{de_j}{dq}\right]$$

is the first order approximation to the Hessian matrix. In a standard SSD registration algorithm, $e_j(q)$ is voxel j's intensity difference between the reference and the moving images, and q is the transformation parameter. Once δq is obtained, the parameters can be updated by adding δq to the current estimate, $q_0$.

For image registration, the function $e_i(q)$ takes the form $f(x_i) - g(T(x_i, p))$, and $de_i/dq$ is replaced by $$\nabla g \frac{\partial T}{\partial q},$$

where the gradient of g is evaluated at $T(x_i, q_0)$, and $\partial T/\partial q$ is the Jacobian of the registration transformation evaluated at $(x_i, q_0)$.

If q forms a semi-group, updating can also be performed in a compositional fashion with a slight modification of the Taylor expansion. In this case, the gradient of g is evaluated with respect to the registration transformation T, and the Jacobian of the registration transformation is evaluated at $(x_i, 0)$. This Jacobian can thus be precomputed. The registration transformation is updated according to $T(x_i, q) \leftarrow T(T(x_i, \delta q), q_0)$.

Unlike a gradient descent based method, it is not necessary to set a step size in a Gauss-Newton method because of the approximated Hessian matrix. In a gradient descent based method, the step size not only controls the rate of convergence, but also determines whether the method actually can converge. In Gauss-Newton method according to an embodiment of the invention, $\hat{H}$ is only an approximation to the Hessian matrix, and the update in the Gauss-Newton method does not guarantee a reduction in energy. However, if $\hat{H}$ is a good approximation to the Hessian matrix, the minimization is faster than the gradient descent based methods because $\hat{H}$ implicitly provides a good step size.

Multimodal Image Registration with Intensity Correction

The standard similarity measure between a monomodal image pair is their intensity difference, and the corresponding registration algorithm is usually an SSD registration algorithm. The energy function of this algorithm is $$E(p) = \frac{1}{2} \sum_{i=1}^{N} (f(x_i) - g(T(x_i, p)))^2,$$

where $f(x_i)$ is the intensity of voxel i in a reference image and $x_i$ represents the index vector of voxel i. The function $g(T(x_i; p))$ is the intensity of voxel i intensity in a moving image after registration transformation T applied, and p are the transformation parameters. According to an embodiment of the invention, focusing on intra-subject registration, T can be chosen to be either an affine or a rigid transformation. The assumption of monomodal registration is that when two images are well aligned, the intensity difference between them is small. Since E is in a sum of squares format, the optimum transformation parameters can be obtained by minimizing E using a Gauss-Newton method.

Figure 6:
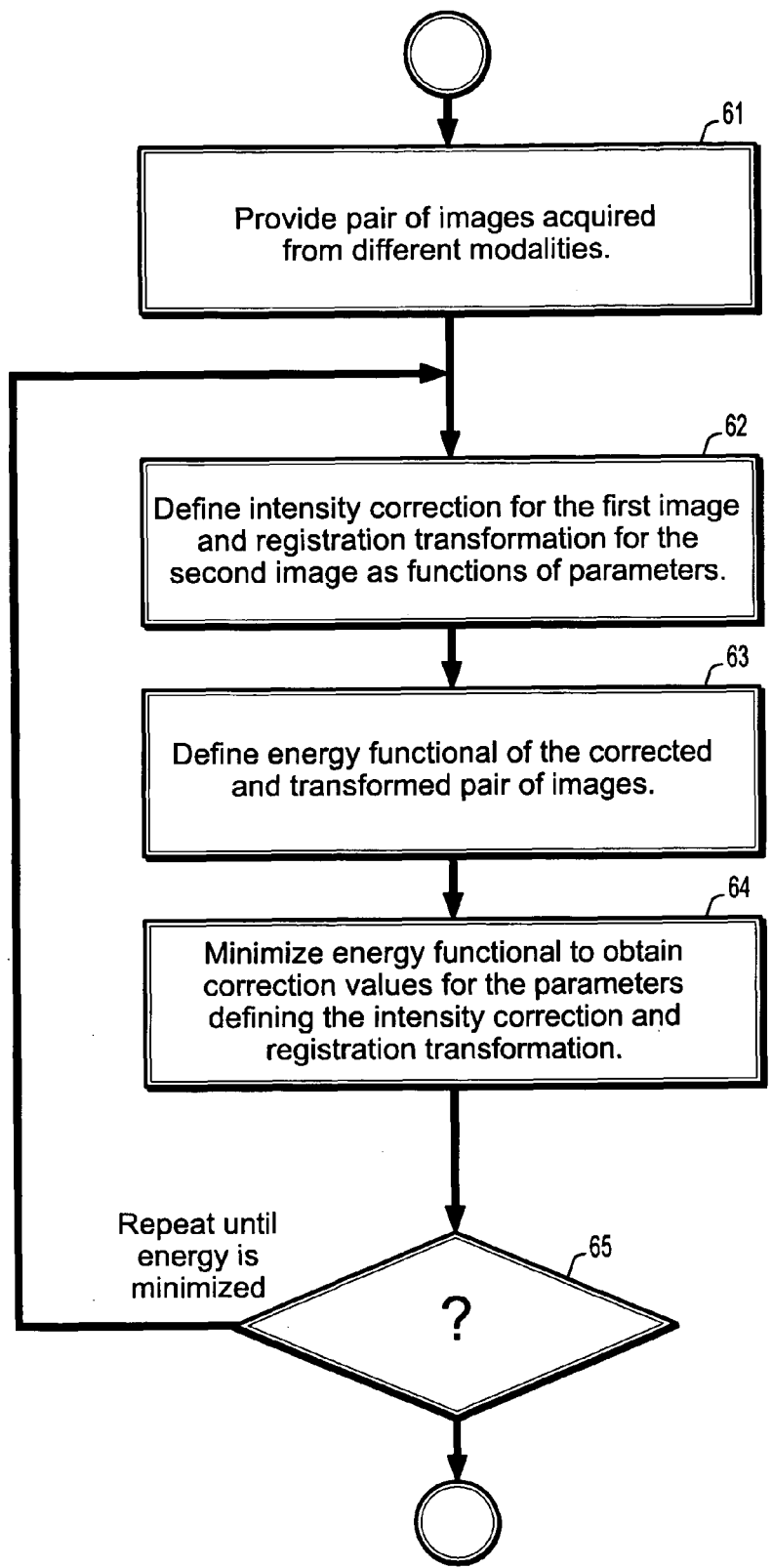
FIG. 6 is a flowchart of an intensity-corrected sum-of-squared-differences registration algorithm according to an embodiment of the invention.

A flowchart of a multimodal registration method according to an embodiment of the invention is shown in FIG. 6. Referring to the flowchart, a method begins at step 61 by providing a pair of images acquired from differing modalities. One of the pair of images is arbitrarily selected as the reference image, and the other image is treated as the moving image.

According to an embodiment of the invention, when an intensity correction is introduced to the reference image, the intensity difference between the reference image with intensity correction and the moving image is small when they are well aligned. An intensity-corrected SSD method according to an embodiment of the invention will be referred to herein below as IC-SSD. The intensity correction is incorporated at step 62 wherein a functional relationship, $\Phi(\ )$ of the intensity is assumed to exist between the images acquired from different modalities.

There are two sets of parameters in the energy functional in an IC-SSD according to an embodiment of the invention: the transformation parameters, p, and the intensity correction parameters, a. The energy function is defined at step 63 as $$E(a, p) = \frac{1}{2} \sum_{i=1}^{N} (\Phi(f(x_i), a) - g(T(x_i, p)))^2. \quad (2)$$

The energy function remains in a sum of square format, and can be minimized with respect to a and p using Gauss-Newton method. To simplify notation, the parameters can be combined as $q^T = [p^T a^T]$, and the energy function can be rewritten in an equivalent form as $$E(q) = \frac{1}{2} \sum_{i=1}^{N} (\tilde{\Phi}(f(x_i), q) - g(\tilde{T}(x_i, q)))^2, \quad (3)$$

where $\tilde{\Phi}$ is similar to $\Phi$ except for having more input parameters, and the input parameters corresponding to the transformation lie in $\tilde{\Phi}$'s null space. Matrix $\tilde{T}$ is a K % K matrix, where K is the number of elements in q. The upper left corner of $\tilde{T}$ equals T, and the rest of the entries equal 0. In other words, the input parameters corresponding to an intensity correction lie in $\tilde{T}$'s null space.

Compared with the derivation of Gauss-Newton method shown in the previous section, $e_i(q)$ can be considered to be $$e_i(q) = \tilde{\Phi}(f(x_i), q) - g(\tilde{T}(x_{i,q})),$$

the first order derivative is $$\frac{\partial e_i}{\partial q} = \frac{\partial \tilde{\Phi}(f(x_i), q)}{\partial q} - \nabla g \frac{\partial \tilde{T}(x_i, q)}{\partial q},$$

and the energy functional to first order is $$E(q_0 + \delta q) = \frac{1}{2}\sum_{i=1}^{N}\left(\Phi(f(x_i), q_0) + \frac{\partial \Phi(f(x_i), q)}{\partial q}\delta q - \nabla g \frac{\partial \tilde{T}(x_i, q)}{\partial q}\delta q - g(\tilde{T}(x_i, q_0))\right)^2.$$

The parameter update, $\delta q$, that minimizes the energy function is obtained at step 64 by this approximation to the energy. In general, $\delta q$ will take the form $$\delta q = -\hat{H}^{-1}\sum_{i=1}^{N}\left[\frac{\partial \Phi(f(x_i), q)}{\partial q} - \nabla g \frac{\partial \tilde{T}(x_i, q)}{\partial q}\right]^T (\tilde{\Phi}(f(x_i), q) - g(\tilde{T}(x_i, q)))$$

where, as before, $$\hat{H} = \sum_{j=1}^{N}\left[\frac{\partial \Phi(f(x_j), q)}{\partial q} - \nabla g \frac{\partial \tilde{T}(x_j, q)}{\partial q}\right]^T\left[\frac{\partial \Phi(f(x_j), q)}{\partial q} - \nabla g \frac{\partial \tilde{T}(x_j, q)}{\partial q}\right].$$

According to an embodiment of the invention, E is optimized with respect to both p and a with no constraints on the two parameters, a method referred to herein below as a joint optimization method.

Steps 62, 63, and 64, can be repeated from step 65 as necessary to improve the registration, using the updated parameters to refine the intensity relationship function $\Phi$ and the registration transformation T. The parameters can be updated according to $q \leftarrow q_0 + \delta q$, or the intensity correction and registration transformation functions can be updated compositionally according to $T(x_i, q) \leftarrow T(T(x_i, \delta q), q_0)$ and $\Phi(f(x_i), a) \leftarrow \Phi(\Phi(f(x_i), \delta a), a_0)$, with appropriate modifications to the gradient $\nabla g$ and the Jacobians $$\frac{\partial \Phi}{\partial q} \text{ and } \frac{\partial \tilde{T}}{\partial q}.$$

Polynomial Model with Joint Optimization

As shown in EQ. (3), registration depends on the model of the intensity correction function, $\Phi$. According to an embodiment of the invention, $\Phi$ can be modeled as an $m^{th}$-order polynomial. Because of the special form of polynomial, EQ. (2) can be rewritten in matrix notation to further simplify notation:

$$E(a, p) = \frac{1}{2}\|Xa - y\|^2, \quad (4)$$

where $$X = \begin{bmatrix} 1 & f(x_1) & f^2(x_1) & \cdots & f^m(x_1) \\ 1 & f(x_2) & f^2(x_2) & \cdots & f^m(x_2) \\ \vdots & \vdots & \vdots & \ddots & \vdots \\ 1 & f(x_N) & f^2(x_N) & \cdots & f^m(x_N) \end{bmatrix},$$

the polynomial coefficients are $a = [a_0, a_1, a_2, \ldots, a_m]^T$, and the stack of voxel intensities of a moving image with transformation T applied is $$y = [g(T(x_1, p)), g(T(x_2, p)), \ldots, g(T(x_N, p))]^T.$$

After combining the parameters into q, the corresponding energy function is:

$$E(q) = \frac{1}{2}\|\tilde{X}q - \tilde{y}\|^2, \quad (5)$$

where $$\tilde{X} = \begin{bmatrix} 0 & \cdots & 0 & 1 & f(x_1) & f^2(x_1) & \cdots & f^m(x_1) \\ 0 & \cdots & 0 & 1 & f(x_2) & f^2(x_2) & \cdots & f^m(x_2) \\ \vdots & \ddots & \vdots & \vdots & \vdots & \vdots & \ddots & \vdots \\ 0 & \cdots & 0 & 1 & f(x_N) & f^2(x_N) & \cdots & f^m(x_N) \end{bmatrix}$$

and $$y = [g(\tilde{T}(x_1, p)), g(\tilde{T}(x_2, p)), \ldots, g(\tilde{T}(x_N, p))]^T.$$

For example, $\tilde{X}$ begins with six columns of 0's in 2D affine case and 12 columns of 0's in the 3D affine case.

Comparing EQ. (5) with EQ. (3), it is straightforward to see that $$\frac{\partial \tilde{\Phi}(f(x_i), q)}{\partial q} = [0 \quad \cdots \quad 0 \quad 1 \quad f(x_i) \quad f^2(x_i) \quad \cdots \quad f^m(x_i)].$$

The derivation of $$\frac{\partial \tilde{T}(x_i, q)}{\partial q}$$

is more complicated. In a 3D affine case, T is parameterized as $$\begin{bmatrix} 1+q_0 & q_3 & q_6 & q_9 \\ q_1 & 1+q_4 & q_7 & q_{10} \\ q_2 & q_5 & 1+q_8 & q_{11} \end{bmatrix},$$

It is straightforward to see that $$\frac{\partial T(x_i, q)}{\partial q} = [A \quad B],$$

where $$A = \begin{bmatrix} x_{1_i} & 0 & 0 & x_{2_i} & 0 & 0 & x_{3_i} & 0 & 0 \\ 0 & x_{1_i} & 0 & 0 & x_{2_i} & 0 & 0 & x_{3_i} & 0 \\ 0 & 0 & x_{1_i} & 0 & 0 & x_{2_i} & 0 & 0 & x_{3_i} \end{bmatrix},$$

$$B = I_3,$$

and $x_{1_i}, x_{2_i}, x_{3_i}$ are the 3D coordinates for voxel i.

In a 3D rigid case, it is easier to express $T=[T_R \ T_T]$ in terms of its rotation component, $T_R$, and translation component, $T_T$:

$$T_R = \begin{bmatrix} 1 & 0 & 0 \\ 0 & \cos(q_0) & \sin(q_0) \\ 0 & -\sin(q_0) & \cos(q_0) \end{bmatrix} \times \begin{bmatrix} \cos(q_1) & 0 & -\sin(q_1) \\ 0 & 1 & 0 \\ \sin(q_1) & 0 & \cos(q_1) \end{bmatrix} \times \begin{bmatrix} \cos(q_2) & \sin(q_2) & 0 \\ -\sin(q_2) & \cos(q_2) & 0 \\ 0 & 0 & 1 \end{bmatrix},$$

and $$T_T = \begin{bmatrix} q_3 \\ q_4 \\ q_5 \end{bmatrix},$$

where, $q_0$, $q_1$, and $q_2$ are the rotation angles along the x, y, and z axes, respectively, and $q_3$, $q_4$, and $q_5$ are the corresponding translations.

As in the affine case, $$\frac{\partial T(x_i, q)}{\partial q} = [A \ B],$$

where B is the same as the affine case, a 3% 3 identity matrix. However, due to the complicated expressions for the elements of A, they are expressed herein element-by-element:

$A_{00} = 0$ $A_{01} = -x_{1_i} \% \sin(q_1)\cos(q_2) - x_{2_i} \% \sin(q_1)\sin(q_2) - x_{3_i} \% \cos(q_1)$ $A_{02} = -x_{1_i} \% \cos(q_1)\sin(q_2) + x_{2_i} \% \cos(q_1)\cos(q_2)$ $A_{10} = x_{1_i} \% (\cos(q_0)\sin(q_1)\cos(q_2) + \sin(q_0)\sin(q_2)) +$
$\quad x_{2_i} \%(\cos(q_0)\sin(q_1)\sin(q_2) - \sin(q_0)\cos(q_2)) +$
$\quad x_{3_i} \% \cos(q_0)\cos(q_1)$ $A_{11} = x_{1_i} \% \sin(q_0)\cos(q_1)\cos(q_2) +$
$\quad x_{2_i} \% \sin(q_0)\cos(q_1)\sin(q_2) -$
$\quad x_{3_i} \% \sin(q_0)\sin(q_1))$ $A_{12} = -x_{1_i} \% (\sin(q_0)\sin(q_1)\sin(q_2) + \cos(q_0)\cos(q_2)) +$
$\quad x_{2_i} \% (\sin(q_0)\sin(q_1)\cos(q_2) - \cos(q_0)\sin(q_2))$ $A_{20} = -x_{1_i} \% (\sin(q_0)\sin(q_1)\cos(q_2) - \cos(q_0)\sin(q_2)) -$
$\quad x_{2_i} \% (\sin(q_0)\sin(q_1)\sin(q_2) + \cos(q_0)\cos(q_2)) -$
$\quad x_{3_i} \% \sin(q_0)\cos(q_1)$ $A_{21} = x_{1_i} \% \cos(q_0)\cos(q_1)\cos(q_2) +$
$\quad x_{2_i} \% \cos(q_0)\cos(q_1)\sin(q_2) -$
$\quad x_{3_i} \% \cos(q_0)\sin(q_1)$ $A_{22} = -x_{1_i} \% (\cos(q_0)\sin(q_1)\sin(q_2) - \sin(q_0)\cos(q_2)) +$
$\quad x_{2_i} \%(\cos(q_0)\sin(q_1)\cos(q_2) + \sin(q_0)\sin(q_2))$ Piecewise Linear Model with Joint Optimization According to another embodiment of the invention, an alternative model for Φ is a piecewise linear function:

$$[a_i, b_i] = \arg\min \frac{1}{2} \sum_{j=1}^{N} G_\sigma(f(x_i) - f(x_j), g(T(x_i, p)) - g(T(x_j, p)))$$

$$[g(T(x_j, p)) - (a_i + b_i f(x_j))]^2$$

where $[a_i; b_i]$ are parameters of the piecewise linear function estimated from $x_i$ and its neighbors in the intensity domain, $G_\sigma$ indicates a Gaussian function with standard deviation a and the energy function is $$E(p) = \frac{1}{2} \sum_{i=1}^{N} [g(T(x_i, p)) - (a_i + b_i f(x_i))]^2.$$

Polynomial Model with Constrained Optimization

Because of the special form of the energy function in EQ. (4) while modeling Φ as a polynomial, it is possible to reduce the search space based on an optimum constraint in the optimization process, and approach referred to herein below as a constrained optimization method.

If the energy is first optimized with respect to a assuming p is fixed, a closed form function between these two parameters can be obtained:

$$\hat{a} = \arg\min_a \|Xa - y\|^2 = (X^T X)^{-1} X^T y. \tag{6}$$

This equation demonstrates that there is a functional relationship between a and p if E achieves a global minimum. Substituting this equation into the energy function, EQ. (4) results in $$E(p) = \frac{1}{2} \|(I_N - X(X^T X)^{-1} X^T) y\|^2 = \frac{1}{2} \|Ry\|^2, \tag{7}$$

which depends only on the transformation parameter p, where $I_N$ is the identity matrix with size N % N. Note that matrix $R=(I_N-X(X^TX)^{-1}X^T)$ is symmetrical, not full rank, and idempotent, i.e., RR=R.

A Gauss-Newton method can again be used to obtain the update step, δp:

$$E(p + \delta p) \approx \frac{1}{2} \left\| R\left(y + \frac{\partial y}{\partial p} \delta p\right) \right\|^2.$$

Setting $$\frac{\partial E}{\partial \delta p} = [Ry]^T \left[R \frac{\partial y}{\partial p}\right] + \left[R \frac{\partial y}{\partial p}\right]^T \left[R \frac{\partial y}{\partial p}\right] \delta p = 0$$

leads to $$\delta p = -\hat{H}^{-1} y^T R \left[\frac{\partial y}{\partial p}\right]$$

where $$\hat{H} = \left[\frac{\partial y}{\partial p}\right]^T R^T R \left[\frac{\partial y}{\partial p}\right] = \left[\frac{\partial y}{\partial p}\right]^T R \left[\frac{\partial y}{\partial p}\right]$$

and $$\frac{\partial y}{\partial p} = \left[\nabla g \frac{\partial T(x_1, p)}{\partial p}, \nabla g \frac{\partial T(x_2, p)}{\partial p}, \cdots \nabla g \frac{\partial T(x_N, p)}{\partial p}\right].$$

Joint Optimization vs. Constrained Optimization

Assuming a global minimum can be obtained using either the constrained optimization method or the joint optimization method, their results should be the same. At a global minimum, a should satisfy EQ. (7) for any given p, including that p* which helps E achieve the global minimum. In other words, the optimal solution from the joint method, [p*a*], should lie inside the search space of the constrained method. Theoretically, the constrained optimization method should be faster because of a smaller search space, but it is only feasible for certain forms of $\Phi$.

In general, the energy function is not convex, and usually has at least some local minima. The constrained optimization method is able to avoid local minima that lie outside of the constrained search space. That means the constrained method encounters no more local minima as compared with the joint method. In the case in which local minima exist in the constrained search space, either the constrained optimization or the joint optimization method may track into a local minimum. Even though they start from the same initial point, the results may be different because they take different search directions. The choice of a method is problem specific.

In terms of computation time, the joint optimization method requires less computation than the constrained optimization method in each iteration. While computing $\hat{H}_{joint}$ takes O(N), it takes O(N$^2$) to compute $\hat{H}_{constrained}$. Since the number of iterations for these methods to stop at a local (global) minimum is problem specific, one cannot claim that the joint optimization method is always faster than the constrained one. Nevertheless, when the size of samples, N, becomes large, it is more likely to see the joint optimization method out perform the constrained optimization method in terms of speed. However, in experiments involving PET-MR registration, a significant computation time difference in these two methods is not seen until N is about $10^5$.

Practical Issues

Initial conditions and parameter settings are important in registration. If neither is set properly, the resulting optimization process may stop at a bad local minimum, take a long time to converge, or even diverge.

According to an embodiment of the invention, a technique to avoid bad local minima and to speed up the registration process is the image pyramid. An image pyramid technique enables a coarse-to-fine registration. The moving image moves in a larger step in a low resolution pyramid level to obtain a coarse alignment, after which it moves in a finer step in the high resolution level to ensure the details of the images are aligned. If too many pyramid levels are used, there may be unnecessary large movements at the low resolution level, which imparts a bad initial condition to the registration in the finer levels. If too few pyramid levels are used, the registration algorithm may stop at a bad local minimum or may take too long to converge. In experiments involving registering PET to MR images, a registration starting at a 2 mm-length voxel shows fast and accurate performance.

To accelerate the registration program, the parameters, a, p, are computed using a fraction of the voxels in an image volume. Techniques for selecting these voxels include selection based on local features and random selection. Images from different modalities emphasize different anatomical structures or tissue types, so that good feature voxels selected from one image may not be well captured by the other image. Similar effects appear when registering images of different resolution. According to an embodiment of the invention, a standard grid is used to sample an image volume. The physical distance between adjacent samples, S, is another parameter for controlling the performance of a method according to an embodiment of the invention. If S is too small, the method can take too long to compute, while if S is too large, there is insufficient information to compute the parameters, resulting in a poor estimate. This may require a large number of iterations for the algorithm to converge. According to embodiments of the invention, S is set to two or three time the voxel length.

Similarly to many registration algorithms, an IC-SSD method according to an embodiment of the invention can be sensitive to initial alignment. If the initial position is beyond the algorithm's capture range, the two images may not be accurately registered. If the coordinates of the origin in both the reference image and the moving image are available, they can be used as warping coordinates. However, if this information is not accessible, an initial estimate of the center of mass or geometry center of the image may substitute for this missing information. In addition, it is helpful to obtain the spatial extent of the image for the reference and the moving images. If the spatial extent of one image is much larger than that of the other, removal of some slices may be necessary to obtain accurate registration results. According to an embodiment of the invention, an alternative technique to handle a different spatial capture range is to apply IC-SSD using a rigid or translation transformation instead of an affine transformation.

A stop criteria is another parameter governing the optimization process. According to an embodiment of the invention, one criteria is based on the energy computed between the reference image and the warped moving image in each iteration. In this case, a method terminates when the energy increases, or when the energy change magnitude between successive iterations falls below some predefined value. In order to implement this stopping criterion, warping should be performed at each iteration, which is computationally intensive in 3D registration. According to an embodiment of the invention, a program terminates when the maximum movement of the moving image is less than a fraction of voxel length. This avoids warping the volume throughout the entire algorithm, although it depends on early large movements to correspond to a decrease of the energy. According to an embodiment of the invention, it was found that setting the fraction as ½ provided accurate registration results with satisfactory speed.

The energy function of an IC-SSD according to an embodiment of the invention is a standard least square function, which is known to be unstable in the presence of outliers. In general, an algorithm according to an embodiment of the invention is vulnerable to image truncation and occlusion. According to another embodiment of the invention, a more robust energy function, such as a weighted least square function, can be used, where a Gauss-Newton method is still applicable. According to another embodiment of the invention, a trimmed least squares is used, where data whose residual error exceeds a certain threshold are considered as outliers and are excluded from the weighted least squares energy function.

Synthetic MR T1 and T2 Registration Results

A registration algorithm according to an embodiment of the invention was tested on MR T1-weighted and T2-weighted images. The anatomical images are T1-weighted and T2-weighted of size 181% 217 voxels with 181 slices, 1.0 mm slice thickness, 1% noise, 20% intensity non-uniformity. The T1 image is set as the reference image and the T2 image as the moving image. A 15 degree clockwise rotation along z-axis, 5 mm translation along x-axis, and 7 mm translation along y-axis are applied to the moving image. FIGS. 1(*a*)-(*b*) depict MR T1 and T2 images before and after registration. The T1 image is shown in gray scale, while the T2 image is presented in the selected intensity range. The left column presents axial views, the middle column presents coronal views, and the right column presents sagittal views. FIG. 1(*a*) shows the relative image position prior to registration. Then, a polynomial IC-SSD algorithm according to an embodiment of the invention is applied to the data sets using both constrained optimization and joint optimization. Since the results are similar, FIG. 1(*b*) depicts only the results obtained by the constrained optimization method.

Figure 2:
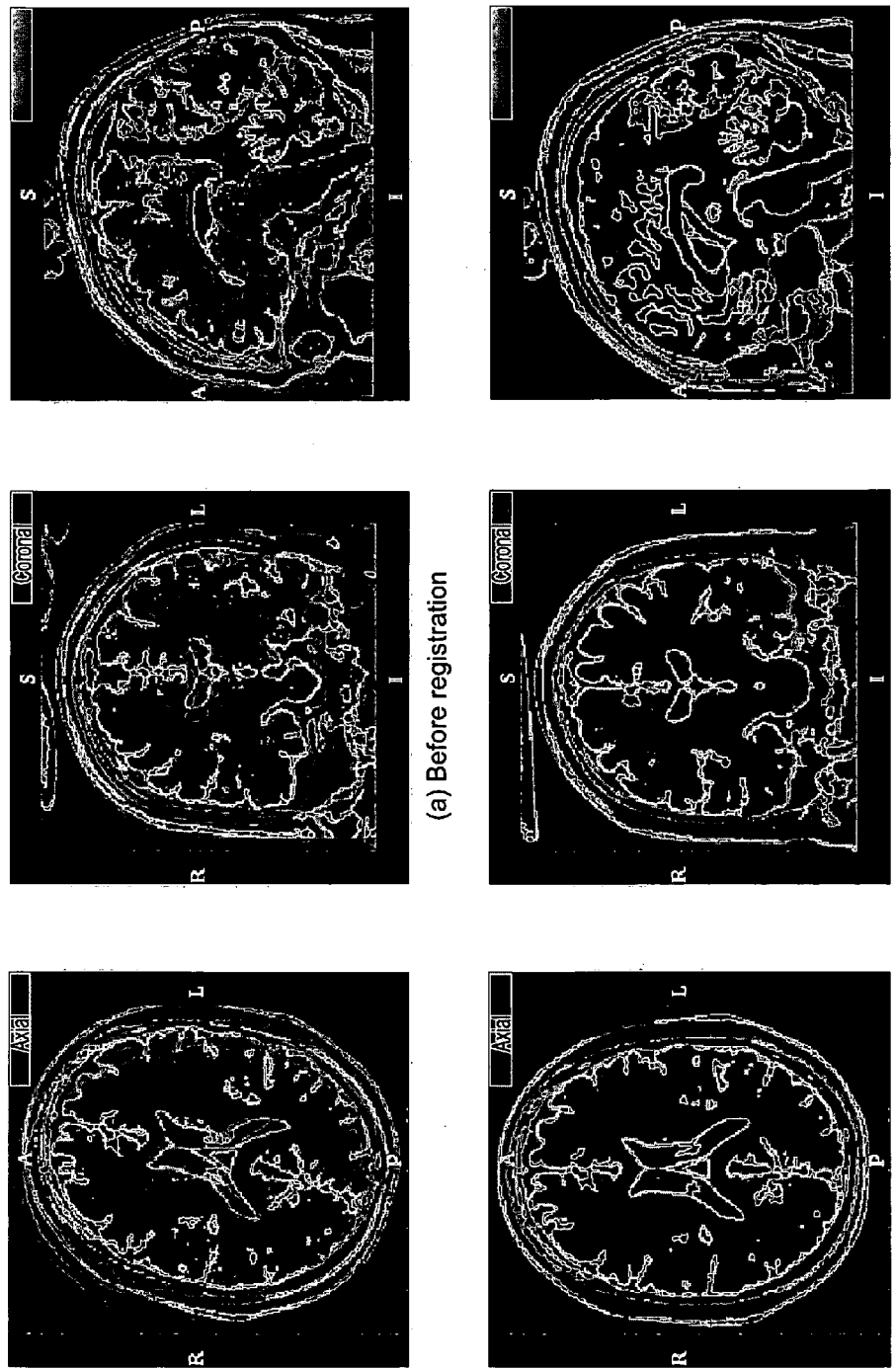
FIGS. 2(a)-(b) depict noisy MR T1 and T2 images before and after registration, according to an embodiment of the invention.

In the presence of noise, an algorithm according to an embodiment of the invention can provide good registration results. The effect of noise was tested by adding Rayleigh noise to both the reference and the moving image. The resulting peak signal-to-noise ratio (PSNR) of the images is about 21 dB. FIGS. 2(*a*)-(*b*) depict noisy MR T1 and T2 images before and after registration. The T1 image is shown in gray scale, while the T2 image is presented in the selected intensity range. The left column presents axial views, the middle column presents coronal views, and the right column presents sagittal views. Identical rotation and translation transformations are applied to the moving image, as depicted in FIG. 2(*a*), and the registration results match the reference image. As the images become more noisy, the capture range of an algorithm according to an embodiment of the invention becomes smaller. Using Rayleigh noise, the capture range is about 20 degrees of rotation.

Figure 3:
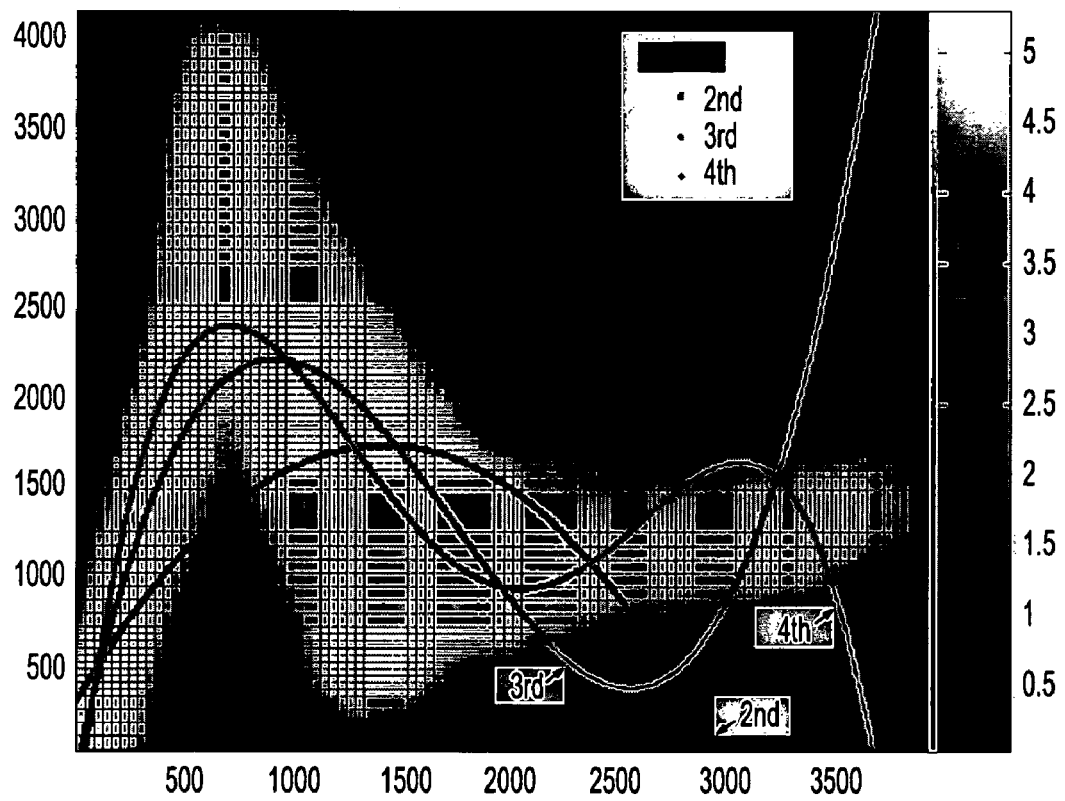
FIG. 3 depicts a pair intensity histogram between MR T1 and T2 images, according to an embodiment of the invention.

According to an embodiment of the invention, a 3th-order polynomial was used for the intensity correction. The joint intensity histogram of the synthetic T1 T2 images, depicted in FIG. 3, shows that it is possible to express the T2 image intensity in terms of a 3th-order polynomial of the T1 image intensity. A higher order polynomial can better describe the data, but the estimation becomes less stable due to ill post conditions.

PET-MR Registration Results

A registration algorithm according to an embodiment of the invention was tested on MR and PET images. The anatomical images are (1) a T1-weighted MR image, 512% 448 voxels, 0.45 mm % 0.45 mm, 25 slices, 5.95 mm slice thickness, and (2) a PET image, 128% 128 voxels, 2 mm % 2 mm, 47 slices, 3.375 mm slice thickness.

Figure 4:
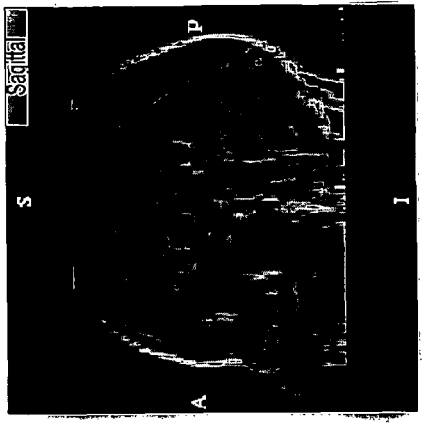
FIGS. 4(a)-(b) depicts MR and PET images before and after registration, according to an embodiment of the invention.
Figure 4:
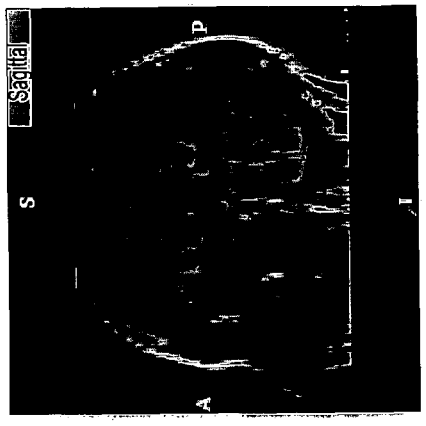
Figure 4:
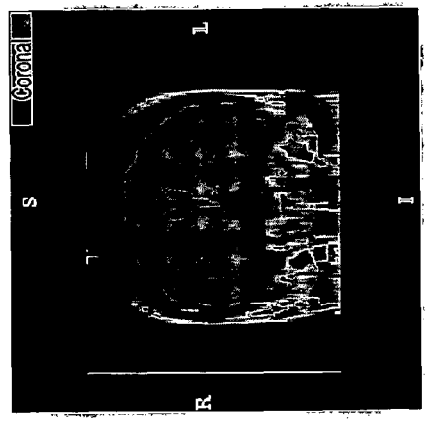
Figure 4:
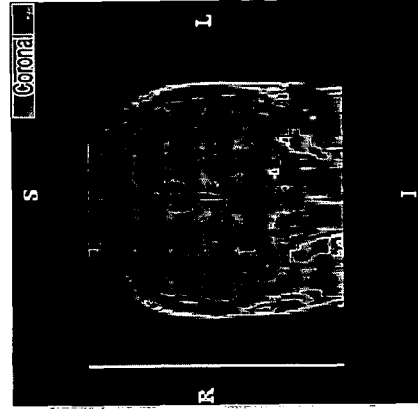
Figure 4:
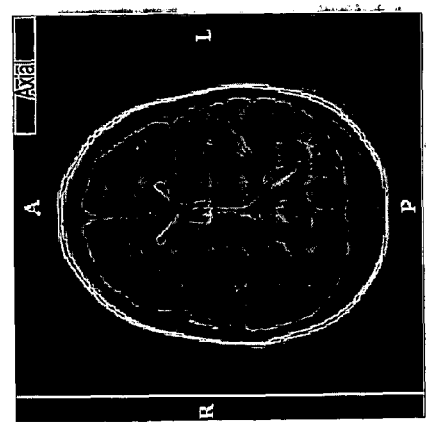
Figure 4:
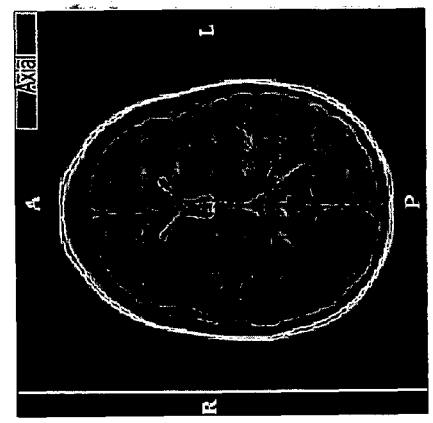

A rigid transformation was used to perform the intra-subject multimodal registration. A high resolution MR image is the reference image, and a low resolution PET image is the moving image. There is no preprocessing performed on the data. FIGS. 4(*a*)-(*b*) depicts MR and PET images before and after registration. The MR image is shown in gray scale, while the PET image is the bright spots. The left column presents axial views, the middle column presents coronal views, and the right column presents sagittal views. FIG. 4(*a*) depicts the MR and PET images prior to registration but after center alignment; FIG. 4(*b*) illustrates the corresponding images after registration. Similar registration results and compatible computation time were obtained using the constrained optimization and the joint optimization methods, and the results obtained from the constrained method is presented in FIG. 4(*b*).

In an experiment according to an embodiment of the invention, it was found that registering images at similar resolutions achieves the best performance in terms of computation time and accuracy. Because of the blurry nature of the PET image, its low resolution pyramid layer does not contain sufficient information for registration. The registration result is generated from the original PET image and an MR pyramid level with compatible resolution. A 9 mm sub-sampling was applied in each direction to accelerate the registration process.

The registration parameters returned from an IC-SSD according to an embodiment of the invention are [0:4068; −3:5581; 13:8369] degrees in rotation and [−21:8; −7:74; −0:73] mm in translation, and the entire registration process takes 3.8 seconds on a 1.4 GHz (1.5 GB RAM) machine.

Figure 5:
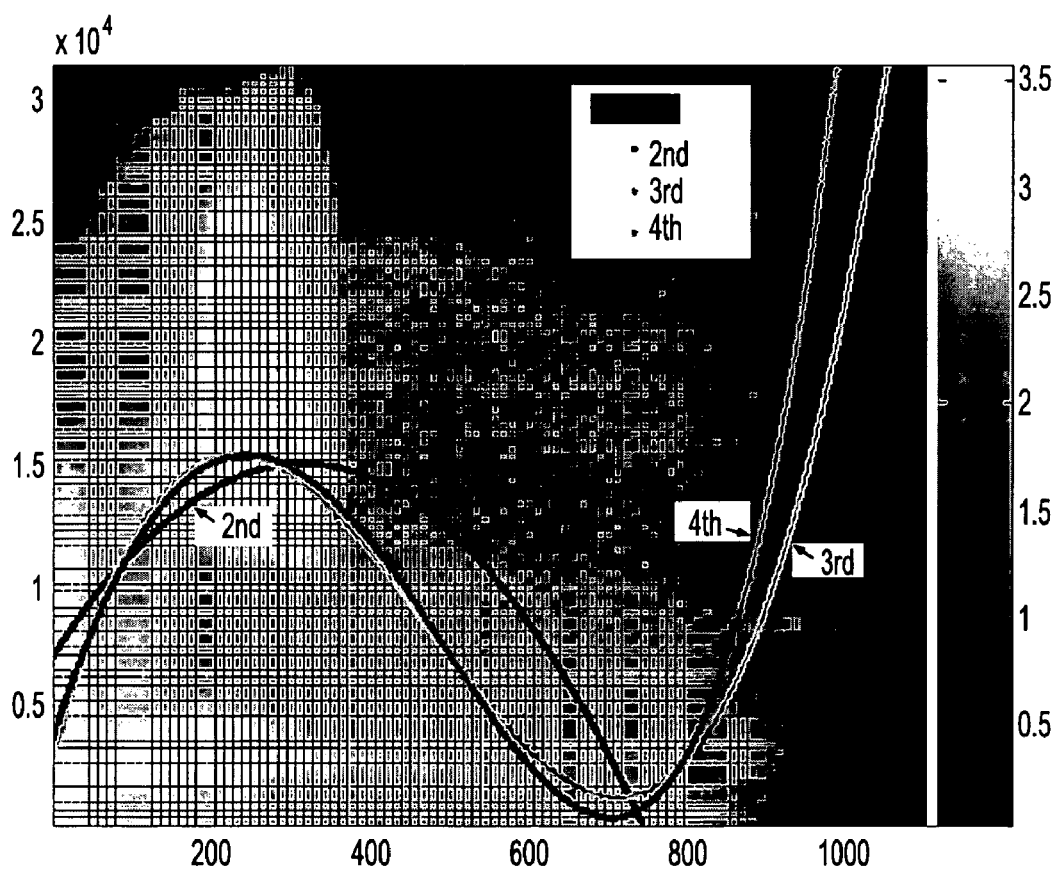
FIG. 5 depicts a pair intensity histogram between MR and PET image, according to an embodiment of the invention.

A pairwise intensity histogram between the MR image and the registered PET image is shown in FIG. 5. It appears that a simple polynomial function does not fit the pairwise intensity pattern. That may be one of the reasons why IC-SSD fails if the registration is extended to an affine transformation. Nevertheless, according to an embodiment of the invention, including more constraints in the transformation, such as those of a rigid transformation, yields satisfactory results.

System Implementations

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
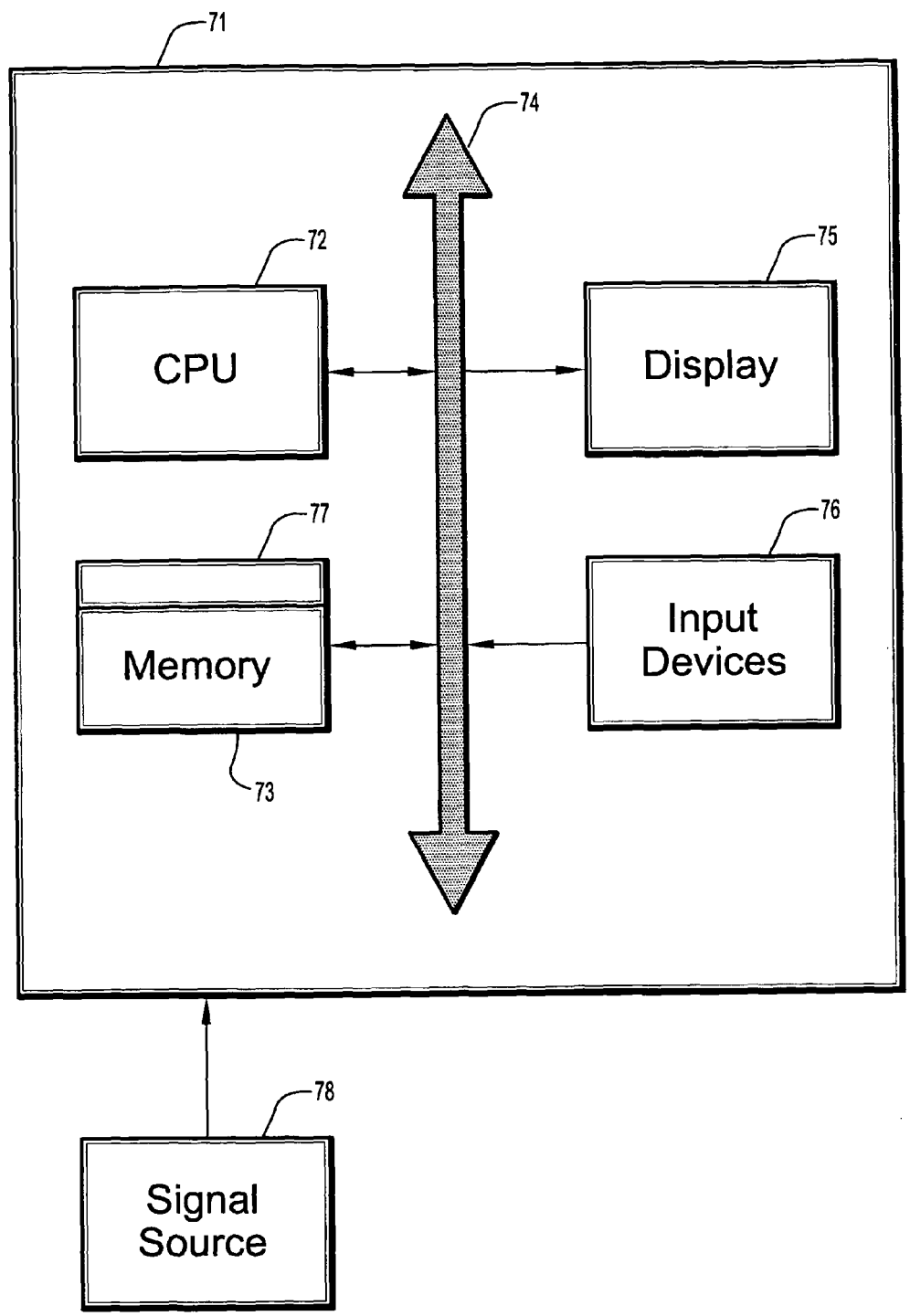
FIG. 7 is a block diagram of an exemplary computer system for implementing an intensity-corrected sum-of-squared-differences registration algorithm, according to an embodiment of the invention.

FIG. 7 is a block diagram of an exemplary computer system for implementing an intensity-corrected sum-of-squared-differences registration algorithm, according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for multimodal image registration, the method comprising the steps of:
   providing a pair of images, each image of said pair acquired from a different imaging modality, each said image comprising a plurality of intensities corresponding to a domain of points on an N-dimensional grid;
   defining an intensity correction function that corrects the intensities of a first of said pair of images in terms of the intensities of the second of said pair of images;
   defining a registration transformation function that registers said second image with said first image, wherein said intensity correction function and transformation function are functions of a plurality of parameters;
   obtaining corrections to said plurality of parameters by minimizing an energy functional of a square difference of said intensity corrected first image and said registration transformed second image; and
   updating said intensity correction function and said registration transformation function based on said corrected plurality of parameters.

2. The method of claim 1, wherein said registration transformation function is either an affine transformation or a rigid transformation.

3. The method of claim 1, wherein said intensity correction function is an $m^{th}$-order polynomial function.

4. The method of claim 1, wherein said intensity correction function is a piecewise linear function of said parameters.

5. The method of claim 1, wherein said steps of updating said intensity correction function and said registration transformation function and obtaining corrections to said plurality of parameters are repeated until said energy functional stops decreasing as a result of said corrections or differences in said energy functional become less than a predetermined constant.

6. The method of claim 1, wherein said parameters are updated according to $q_{i+1} \leftarrow q_i + \delta q$, wherein $q_i$ are the uncorrected parameters, $q_{i+1}$ are the corrected parameters, and $\delta q$ are the parameter corrections.

7. The method of claim 6, wherein said parameters corrections $\delta q$ take a form equivalent to $$-\hat{H}^{-1} \sum_{i=1}^{N} \left[ \frac{\partial \tilde{\Phi}(f(x_i), q)}{\partial q} - \nabla g \frac{\partial \tilde{T}(x_i, q)}{\partial q} \right]^T \left( \tilde{\Phi}(f(x_i), q) - g(\tilde{T}(x_i, q)) \right)$$

wherein $$\hat{H} = \sum_{j=1}^{N} \left[ \frac{\partial \tilde{\Phi}(f(x_j), q)}{\partial q} - \nabla g \frac{\partial \tilde{T}(x_j, q)}{\partial q} \right]^T \left[ \frac{\partial \tilde{\Phi}(f(x_j), q)}{\partial q} - \nabla g \frac{\partial \tilde{T}(x_j, q)}{\partial q} \right],$$

and wherein q represents the plurality of parameters, $\tilde{\Phi}$ represents the intensity correction function, $f(x_i)$ represents said first image as a function on domain points $x_i$, N is the number of image domain points, $\tilde{T}$ represents the registration transformation function, g represents said second image, wherein the gradient of g is evaluated at $T(x_i, q_0)$ wherein $q_0$ are the uncorrected parameters, and $\partial T/\partial q$ is the Jacobian of the registration transformation evaluated at $(x_i, q_0)$.

8. The method of claim 3, wherein said intensity correction function is a function of parameter subset a and said registration transformation function is a function of parameter subset p, and wherein obtaining corrections to said plurality of parameters comprises minimizing said energy functional with respect to intensity correction parameters a holding parameters p fixed to obtain updated intensity correction parameters â, expressing said energy functional in terms of said updated intensity correction parameters, minimizing said energy functional with respect to transformation parameters p to obtain corrected transformation parameters δp.

9. The method of claim 1, wherein said registration transformation function is calculated using an image pyramid.

10. The method of claim 1, wherein said plurality of parameters are computed using a fraction of points in said images.

11. The method of claim 1, wherein said energy functional is minimized with a Gauss-Newton algorithm.

12. The method of claim 1, wherein said energy functional is a weighted sum of square differences of said intensity corrected first image and said registration transformed second image.

13. The method of claim 1, wherein said intensity correction function is a function of parameter subset a and said registration transformation function is a function of parameter subset p, and wherein said intensity correction function $\Phi$ and registration transformation function T can be updated compositionally according to $T(x_i, p) \leftarrow T(T(x_i, \delta p), p_0)$ and $\Phi(f(x_i), a) \leftarrow \Phi(\Phi(f(x_i), \delta a), a_0)$, wherein $f(x_i)$ is the image intensity at image point $x_i$, $p_0$ and $a_0$ are the respective uncorrected intensity correction and transformation parameters, and δp and δa are the respective intensity correction and transformation parameter corrections.

14. A method for multimodal image registration, the method comprising the steps of:
   providing a pair of images, each image of said pair acquired from a different imaging modality, each said image comprising a plurality of intensities corresponding to a domain of points on an N-dimensional grid;
   defining an intensity correction function that corrects the intensities of a first of said pair of images in terms of the intensities of the second of said pair of images, wherein said intensity correction function is a function of a plurality of parameters;
   obtaining corrections to said plurality of parameters by minimizing an energy functional of said intensity corrected first image; and
   updating said intensity correction function based on said corrected plurality of parameters according to $q_{i+1} \leftarrow q_i + \delta q$, wherein $q_i$ are the uncorrected parameters, $q_{i+1}$ are the corrected parameters, and δq are the parameter corrections, wherein said steps of updating said intensity correction function and obtaining corrections to said plurality of parameters are repeated until said energy functional stops decreasing as a result of said corrections or differences in said energy functional become less than a predetermined constant.

15. The method of claim 14, further comprising defining a registration transformation function that registers said second image with said first image, wherein said transformation function is a function of an additional plurality of parameters, wherein said energy functional comprises a sum of square differences of said intensity corrected first image and said registration transformed second image, and updating said registration transformation function based on said corrected plurality of parameters.

16. A program storage device readable by a computer, tangibly embodying a program of instructions executable by the computer to perform the method steps for multimodal image registration, the method comprising the steps of:
   providing a pair of images, each image of said pair acquired from a different imaging modality, each said image comprising a plurality of intensities corresponding to a domain of points on an N-dimensional grid;

defining an intensity correction function that corrects the intensities of a first of said pair of images in terms of the intensities of the second of said pair of images;

defining a registration transformation function that registers said second image with said first image, wherein said intensity correction function and transformation function are functions of a plurality of parameters;

obtaining corrections to said plurality of parameters by minimizing an energy functional of a square difference of said intensity corrected first image and said registration transformed second image; and updating said intensity correction function and said registration transformation function based on said corrected plurality of parameters.

17. The computer readable program storage device of claim 16, wherein said registration transformation function is either an affine transformation or a rigid transformation.

18. The computer readable program storage device of claim 16, wherein said intensity correction function is an $m^{th}$-order polynomial function.

19. The computer readable program storage device of claim 16, wherein said intensity correction function is a piecewise linear function of said parameters.

20. The computer readable program storage device of claim 16, wherein said steps of updating said intensity correction function and said registration transformation function and obtaining corrections to said plurality of parameters are repeated until said energy functional stops decreasing as a result of said corrections or differences in said energy functional become less than a predetermined constant.

21. The computer readable program storage device of claim 16, wherein said parameters are updated according to $q_{i+1} \leftarrow q_i + \delta q$, wherein $q_i$ are the uncorrected parameters, $q_{i+1}$ are the corrected parameters, and $\delta q$ are the parameter corrections.

22. The computer readable storage device of claim 21, wherein said parameters corrections $\delta q$ take a form equivalent to $$-\hat{H}^{-1} \sum_{i=1}^{N} \left[\frac{\partial \tilde{\Phi}(f(x_i), q)}{\partial q} - \nabla g \frac{\partial \tilde{T}(x_i, q)}{\partial q}\right]^T \left(\tilde{\Phi}(f(x_i), q) - g\left(\tilde{T}(x_i, q)\right)\right)$$

wherein $$\hat{H} = \sum_{j=1}^{N} \left[\frac{\partial \tilde{\Phi}(f(x_j), q)}{\partial q} - \nabla g \frac{\partial \tilde{T}(x_j, q)}{\partial q}\right]^T \left[\frac{\partial \tilde{\Phi}(f(x_j), q)}{\partial q} - \nabla g \frac{\partial \tilde{T}(x_j, q)}{\partial q}\right],$$

and wherein q represents the plurality of parameters, $\tilde{\Phi}$ represents the intensity correction function, $f(x_i)$ represents said first image as a function on domain points $x_i$, N is the number of image domain points, $\tilde{T}$ represents the registration transformation function, g represents said second image, wherein the gradient of g is evaluated at $T(x_i, q_0)$ wherein $q_0$ are the uncorrected parameters, and $\partial T/\partial q$ is the Jacobian of the registration transformation evaluated at $(x_i, q_0)$.

23. The computer readable program storage device of claim 18, wherein said intensity correction function is a function of parameter subset a and said registration transformation function is a function of parameter subset p, and wherein obtaining corrections to said plurality of parameters comprises minimizing said energy functional with respect to intensity correction parameters a holding parameters p fixed to obtain updated intensity correction parameters â, expressing said energy functional in terms of said updated intensity correction parameters, minimizing said energy functional with respect to transformation parameters p to obtain corrected transformation parameters $\delta p$.

24. The computer readable program storage device of claim 16, wherein said registration transformation function is calculated using an image pyramid.

25. The computer readable program storage device of claim 16, wherein said plurality of parameters are computed using a fraction of points in said images.

26. The computer readable program storage device of claim 16, wherein said energy functional is minimized with a Gauss-Newton algorithm.

27. The computer readable program storage device of claim 16, wherein said energy functional is a weighted sum of square differences of said intensity corrected first image and said registration transformed second image.

28. The computer readable program storage device of claim 16, wherein said intensity correction function is a function of parameter subset a and said registration transformation function is a function of parameter subset p, and wherein said intensity correction function $\Phi$ and registration transformation function T can be updated compositionally according to $T(x_i,p) \leftarrow T(T(x_i,\delta p),p_0)$ and $\Phi(f(x_i),a) \leftarrow \Phi(\Phi(f(x_i),\delta a), a_0)$, wherein $f(x_i)$ is the image intensity at image point $x_i$, $p_0$ and $a_0$ are the respective uncorrected intensity correction and transformation parameters, and $\delta p$ and $\delta a$ are the respective intensity correction and transformation parameter corrections.

\* \* \* \* \*